(12) United States Patent
Jiang et al.

(10) Patent No.: US 11,420,139 B2
(45) Date of Patent: Aug. 23, 2022

(54) FILTER PRESS AND FILTER PRESS OF SPIRAL VIBRATION CAKE UNLOADING BY PULLING APART FILTER PLATES TWICE

(71) Applicant: Jingjin Equipment Inc., Shandong (CN)

(72) Inventors: Guiting Jiang, Shandong (CN); Guozhi Liu, Shandong (CN); Wei Song, Shandong (CN); Dongling Liu, Shandong (CN)

(73) Assignee: Jingjin Equipment Inc., Shandong (CN)

( * ) Notice: Subject to any disclaimer, the term of this patent is extended or adjusted under 35 U.S.C. 154(b) by 672 days.

(21) Appl. No.: 16/336,073

(22) PCT Filed: Sep. 18, 2018

(86) PCT No.: PCT/CN2018/106125
§ 371 (c)(1),
(2) Date: Mar. 22, 2019

(87) PCT Pub. No.: WO2019/100826
PCT Pub. Date: May 31, 2019

(65) Prior Publication Data
US 2021/0354060 A1    Nov. 18, 2021

(30) Foreign Application Priority Data

Nov. 27, 2017   (CN) .......................... 201711200369.7

(51) Int. Cl.
*B01D 25/34*      (2006.01)
*B01D 25/21*      (2006.01)

(52) U.S. Cl.
CPC ......... *B01D 25/346* (2013.01); *B01D 25/215* (2013.01)

(58) Field of Classification Search
CPC ..... B01D 25/346; B01D 25/215; B01D 25/12
(Continued)

(56) References Cited

U.S. PATENT DOCUMENTS

| 3,622,005 A | 11/1971 | Kurita |
| 2003/0164327 A1 | 9/2003 | Harms et al. |

FOREIGN PATENT DOCUMENTS

| CN | 2461637 Y | 11/2001 |
| CN | 101024129 A | 8/2007 |

(Continued)

OTHER PUBLICATIONS

English Machine Translation of CN105709474A (Year: 2016).*
(Continued)

*Primary Examiner* — Madeline Gonzalez
(74) *Attorney, Agent, or Firm* — Yue (Robert) Xu; Apex Attorneys at Law, LLP (57) ABSTRACT

A filter press includes a frame, a power component and a plurality of filter plates driven by the power component to move to and fro along the frame to be at a pressure filtration position and an unloading position; a vibration cake unloading device includes a driving component and a vibration shaft longitudinally arranged; and protrusions are provided on an outer circumferential wall of the vibration shaft, when the filter plates are located at the unloading position, in the process that the driving component drives the vibration shaft to rotate around its own axis, the protrusions on the vibration shaft collide with the filter plate to assist in unloading. The vibration shaft has a simple structure, which can greatly reduce the cost, and the vibration cake unloading device is flexible in use. A filter press of spiral vibration cake unloading by pulling apart the filter plate twice is further provided.

13 Claims, 3 Drawing Sheets

(58) Field of Classification Search
USPC .......................... 210/224–231, 346, 347, 486
See application file for complete search history.

(56) References Cited

FOREIGN PATENT DOCUMENTS

| | | | |
|---|---|---|---|
| CN | 101380528 A | | 3/2009 |
| CN | 201558590 U | | 8/2010 |
| CN | 202478692 U | | 10/2012 |
| CN | 204601731 U | | 9/2015 |
| CN | 105709474 A | * | 6/2016 |
| CN | 105709474 A | | 6/2016 |
| CN | 205391847 U | | 7/2016 |
| CN | 205549720 U | | 9/2016 |
| CN | 206518939 U | | 9/2017 |
| CN | 107875694 A | | 4/2018 |
| CN | 207641070 U | | 7/2018 |
| EP | 1149619 A1 | | 10/2001 |
| JP | 2012030209 A | | 2/2012 |

OTHER PUBLICATIONS

International Search Report for PCT/CN2018/106125 dated Nov. 28, 2018, ISA/CN.
Search Report dated Apr. 17, 2020 for European patent application No. 18849452.0, 8 pages.
First Office Action dated Apr. 22, 2019 for Chinese patent application No. 201711200369.7, English translation provided by Global Dossier.

* cited by examiner

FILTER PRESS AND FILTER PRESS OF SPIRAL VIBRATION CAKE UNLOADING BY PULLING APART FILTER PLATES TWICE

The present application is the national phase of International Application No. PCT/CN2018/106125, titled "FILTER PRESS AND FILTER PRESS OF SPIRAL VIBRATION CAKE UNLOADING BY PULLING APART FILTER PLATES TWICE", filed on Sep. 18, 2018, which claims the priority to Chinese Patent Application No. 201711200369.7, titled "FILTER PRESS OF SPIRAL VIBRATION CAKE UNLOADING BY PULLING APART FILTER PLATES TWICE", filed with the National Intellectual Property Administration, PRC on Nov. 27, 2017, the entire disclosures of which applications are incorporated herein by reference.

FIELD

The present application relates to the technical field of filter press in solid-liquid separation industry, and in particular to a filter press and a filter press of spiral vibration cake unloading by pulling apart filters plates twice.

BACKGROUND

The filter press is a main filter device in the solid-liquid separation industry. After material filtration is completed, filter plates are pulled apart by a plate puller to unload the filter cake. Cake unloading by pulling plates of the filter press is divided into two kinds, the first kind is that the plate puller pulls apart filter plates one by one to unload filter cakes; and the second kind is that the plate puller pulls apart filter plates in groups to unload filter cakes. In the two methods of cake unloading, the filter cakes fall freely after the filter plates are pulled apart. In some cases, a complete set of special pneumatic vibration device is installed above the filter plates to hammer down the filter cakes, so as to unload the filter cakes after the filtration is completed.

During the on-site use of the filter press, it was found that not all the filter cakes fall down after filter plates are pulled apart by the plate puller. Since the filter materials have complex compositions and some of the filter cakes contain viscous substances, the filter cakes often adhere to the filter cloth in a large area, and are difficult to fall.

Although a complete set of vibration device is installed above the filter press to hammer down the filter cakes in the conventional technology, the structure of the pneumatic vibration device has a complex structure, the failure rate is high in use and maintenance is inconvenient. Moreover, the components of the pneumatic vibration device are cumbersome and costly, so it is not practical in the using process of pulling apart the filter plates and hammering down to unload the cake, which directly results in a low filtration efficiency and consequently loss of economic benefits.

Therefore, a technical problem to be solved urgently by those skilled in this field is to save the use cost of falling of the filter cakes in the conventional technology.

SUMMARY

The purpose of the present application is to provide a filter press, which has a low use cost.

For the above purpose, the following technical solution is adopted in the present application:

A filter press includes a frame, and a power component, a plurality of filter plates and a vibration cake unloading device arranged on the frame, wherein:

the filter plates are driven by the power component to move to and fro along the frame to be at a pressure filtration position and an unloading position; and the vibration cake unloading device includes a driving component and a vibration shaft arranged longitudinally, protrusions are provided on an outer circumferential wall of the vibration shaft, when the filter plate is located at the unloading position, in the process that the driving component drives the vibration shaft to rotate around its own axis, the protrusions on the vibration shaft collide with the filter plates to assist in unloading.

In addition, a filter press of spiral vibration cake unloading by pulling apart filter plates twice is further provided in the present application, the technical solution is:

an oil cylinder is provided, and the oil cylinder is a lengthened type, which has a length allowing a plurality of filter plates to be pulled apart for the first time to reach a cake unloading distance, a cake unloading spacing chain is respectively provided on both sides of the filter plate to control a distance;

an oil cylinder bracket is provided, and the oil cylinder bracket has one end connected with a main beam and another end installed at a lower end of the oil cylinder, a piston rod of the oil cylinder is returned to an original position after filtration is completed, and the piston rod is connected with a compression plate to drive the plurality of filter plates to be pulled apart for the first time to unload the cake;

a plate-pulling gear motor is provided, the plate-pulling gear motor is installed on a thrust plate of the filter press, the plate-pulling gear motor is provided with a driving sprocket wheel, and the driving sprocket wheel is connected with a driving chain;

a driving shaft is provided, the driving shaft is provided with a driven sprocket wheel, the driven sprocket wheel is connected with the driving chain, the driving sprocket wheel is provided at both ends of the driving shaft, and the driving sprocket wheel is connected with a driven chain;

a driven shaft is provided, and a driven sprocket wheel is provided on two ends of the driven shaft, one end of the driven sprocket wheel is connected with the driven chain, another end of the driven shaft is connected with a plate-pulling chain, the plate-pulling chain is installed in a chain box, and the chain box is installed on a side of the main beam;

a middle partition board is provided, which is installed at a front end of the filter plates pulled apart for the second time, the spacing chains are installed on both sides of the filter plate;

a holder is provided, which is installed on both sides of the middle partition board, an upper end of the holder is provided with a locking groove to connect the main beam and a lower end of the holder is connected with the plate-pulling chain, a plurality of filter plates are pulled apart for the second time to unload the cake by the middle partition board driven by the plate-pulling chain;

a spiral vibration cake unloading device is provided, which includes a vibration gear motor, the vibration gear motor is provided with a coupling, a vibration shaft is provided, a bearing seat is provided on both ends of the vibration shaft, one end of the vibration shaft is connected with the coupling through the bearing seat, spirally arranged vibration blocks are provided on the vibration shaft, and each vibration block corresponds to a handle installed on the filter plate, and a wear-resisting block is provided at a bottom of the handle, the above components are installed to form the spiral vibration cake unloading device;

two sets of the spiral vibration cake unloading devices are provided and are installed on the main beams, the two sets of the spiral vibration cake unloading devices are installed at a tail end of the main beam on the left and a head end of the main beam on the right, respectively.

Compared with the pneumatic vibration device in the conventional technology, the vibration cake unloading device in the present application is provided with a vibration shaft. When the power component drives the vibration shaft to rotate, the protrusions on the vibration shaft can collide with the filter plates, and the filter cake is vibrated down from the filter plates by a vibration force generated by the protrusions impacting the filter plates. The vibration shaft has a simple structure, which can greatly reduce the cost of filter press, and the vibration unloading device is flexible in use.

In FIG. 1 to FIG. 5:

1. plate-pulling gear motor, 2. plate-pulling chain, 3. middle partition board, 4. holder, 5. filter plate, 6. handle, 7. spacing chain, 8. oil cylinder bracket, 9. vibration gear motor, 10. coupling, 11. bearing seat, 12. vibration shaft, 13. driving chain, 14. driving shaft, 15. driven chain, 16. driven shaft, 17. support frame, 18. vibration block, 19. wear-resisting block

DETAILED DESCRIPTION OF EMBODIMENTS

The present application is described below in further detail with reference to the accompanying drawings and specific embodiments.

Referring to FIG. 1 to FIG. 5, a filter press is provided in the present application, including a frame, a main function of the frame is to provide an installation platform for other parts. The rigidity, strength and material of the frame can be reasonably selected according to the requirements of practical application, and thus are not elaborated in this application.

The frame in the present application is provided with the following parts: a power component, a plurality of filter plates and a vibration cake unloading device.

Each filter plate is driven by the power component to move to and fro along the frame to be at a pressure filtering position and an unloading position. When the filter plates are at the pressure filtering position, the filter plates are closed to each other to press the filter cakes. When the filter plates are at the unloading position, the adjacent filter plates are pulled apart by a predetermined distance to form a space for unloading the filter cake. The connection way between adjacent filter plates can refer to the conventional technology, and thus is not elaborated in this application.

The vibration cake unloading device provided by the present application includes a driving component and a vibration shaft arranged longitudinally. Protrusions are provided on an outer circumferential wall of the vibration shaft. When the filter plate is located at the unloading position, in the process that the driving component drives the vibration shaft to rotate around its own axis, the protrusions on the vibration shaft collide with the filter plates to assist in unloading.

That is to say, in the rotating process of the vibration shaft, the protrusions on the vibration shaft can collide directly or indirectly with the filter plates. Under the impact force of the protrusions and the filter plates, the filter cakes are vibrated and fall down from the filter plates.

Compared with the pneumatic vibration device in the conventional technology, the vibration shaft is provided in the vibration cake unloading device in the present application. When the power component drives the vibration shaft to rotate, the protrusions on the vibration shaft can collide with the filter plates, and the filter cakes are vibrated and fall down from the filter plates by a vibration force generated by the protrusions impacting the filter plates. The vibration shaft has a simple structure, which can greatly reduce the cost of the filter press, and the vibration cake unloading device is flexible in use.

In a specific embodiment, each filter plate can move up and down relative to a frame within a predetermined range in the vertical direction; when the filter plates are located at the unloading position, parts of the filter plates are located above the vibration shaft, and during the rotation of the vibration shaft, the filter plates intermittently contact with the protrusions to vibrate upward and downward repeatedly.

Generally, two sides of an upper end of each filter plate are slidably installed on the frame, and the vibration shaft can be arranged below the two sides of the upper end of the filter plate. Specifically, the vibration shaft can be located below a handle 6 of the filter plate. When the vibration shaft rotates, the protrusions on the vibration shaft collide with the handle 6 at the corresponding side to push the filter plate to move upward. When the protrusions come into contact with the filter plate, a vibration force is generated instantly. When the protrusions rotate away from the filter plate, the filter plate may also generate a vibration force when it falls back to its original position under the action of its own gravity, which is beneficial to the effective removal of the filter cake.

The more filter plates there are, the larger the stroke needed to pull apart the filter plates at once is, so that the longitudinal length of the filter press is greater, so that the installation space of the filter press is correspondingly larger, which greatly limits the application of the filter press in a smaller space environment. In order to overcome the above shortcomings, the following solutions are further provided in the present application.

In a preferred embodiment, the power component includes an oil cylinder and auxiliary power components. The oil cylinder can be installed at an end portion of the frame through an oil cylinder bracket. In the longitudinal direction, all the filter plates are divided into a first part of filter plates and a second part of filter plates. The oil cylinder drives all the filter plates to be at the pressure filtering position, when the oil cylinder retracts to an initial state, all the filter plates in the first part of filter plates are pulled apart by a predetermined distance to form an unloading space. The auxiliary power components drive all the filter plates in the second part of the filter plates to be pulled apart by a predetermined distance to form an unloading space, and at the same time, the distance between all the filter plates in the first part of the filter plates is decreased.

When the oil cylinder operates, its piston rod has two positions: a fully extended working position and a fully retracted working position. When all the filter plates are in a state of pressing the filter cake, the piston rod of the oil cylinder can be in a first limit position. The first limit position can be the fully extended working position or the fully retracted working position, which is related to the installation position of the oil cylinder. In this application, preferably, the technical solution is introduced taking the case in which the piston rod is gradually extended to press the filter plate as an example.

The piston rod of the oil cylinder is extended to press the filter plate. When the filtration is completed, the piston rod is gradually retracted, thereby driving the filter plates connected to the end of the piston rod of the cylinder to move backward. When the space between the filter plates reaches the maximum, the piston rod retracts back to an original position. At this time, the oil cylinder stops working and the first part of the filter plates are vibrated to unload cake. After the first part of the filter plates completes the unloading, the auxiliary power components start to move, and the auxiliary power components drive the adjacent filter plates in the second part of the filter plates to be pulled apart by a predetermined distance to form an unloading space. While the second part of filter plates are pulled apart again, the first part of filter plates are squeezed, and the distance between the filter plates in the first part of filter plates becomes smaller.

When the second part of filter plates completes the vibration unloading, the oil cylinder extends to push the first part of filter plates and the second part of filter plates to move simultaneously to perform the next pressure filtration.

In the above embodiment, when the first part of filter plates are pulled apart, the second part of filter plates are in a compressive state; when the second part of filter plates are pulled apart, the first part of filter plates are in a compressive state. In this way, not only the length of the oil cylinder in use can be greatly shortened, but also the longitudinal length of the filter press can be reduced.

Preferably, the number of filter plates in the first part of filter plates is the same as the number of filter plates in the second part of filter plates.

Of course, times of all the filter plates being pulled apart is not limited to two, but also can be three or more times, as long as corresponding auxiliary power components are provided.

In a specific embodiment, an auxiliary power component can be a motor-sprocket wheel-chain structure, which includes a motor and two plate-pulling chains 2 driven by the motor. The two plate-pulling chains 2 are respectively located on both sides of the filter plates. The filter press further includes a middle partition board 3, which is fixedly connected with the outermost filter plate of the second part of filter plates and is close to an end of the first part of filter plates. Two sides of the middle partition board 3 are fixed to the plate-pulling chains 2 on both sides, respectively.

The motor can be a gear motor, which is defined as a plate-pulling gear motor 1.

In the present embodiment, the arrangement of the motor-sprocket wheel-chain structure is flexible, which can achieve a compact structure of the filter press to further shorten the longitudinal length of the filter press.

In one embodiment, the motor is installed at a bottom of the frame, and the filter press further includes a driving shaft 14 which is transversely rotatably supported on the frame. The driving shaft 14 can be rotatably supported on a main beam of the frame through bearings, and both ends of the driving shaft 14 are provided with the bearings. The position of the driving shaft 14 is higher than that of the motor. An output shaft of the motor transmits power to the driving shaft 14 through a sprocket wheel-chain, that is, a driving sprocket wheel is provided at the output end of the motor, and the sprocket wheel is also provided on the driving shaft 14. The driving sprocket wheel of the motor and the sprocket wheel of the driving shaft 14 are connected by the chain to realize the power transmission. At the same time, sprocket wheels meshing with two plate-pulling chains 2 are provided at two ends of the driving shaft 14, respectively.

Furthermore, in order to facilitate the layout of various components, the filter press can further include two sets of driven chains 15 and driven shafts 16. The sprocket wheels meshing with the plate-pulling chain 2 are provided on the driven shaft 16, and the power of the driving shaft 14 is transmitted to the driven shaft 16 through the driven chain 15.

That is to say, the power of the motor is transferred to the plate-pulling chain 2 through the driving shaft 14, the driven chain 15, the driven shaft 16 and the sprocket wheels on the driven shaft in sequence.

In order to ensure the smooth movement of the middle partition board, two ends of the middle partition board 3 can further be respectively provided with a holder 4. The holder is driven by the motor to rotate, thus driving the middle partition board 3 to move to the right, and thus the second part of filter plates are pulled apart.

The number of the vibration cake unloading devices is two, and the two vibration cake unloading devices are respectively used for vibration cake unloading of the first part of filter plates and the second part of filter plates, that is, the number of the driving parts, the vibration shafts and parts cooperating with them are both two. The two vibration cake unloading devices can work independently without affecting each other.

A specific structure form of the protrusion is described hereinafter.

In each of the above embodiments, at least two groups of protrusions are arranged along the longitudinal vibration shaft, the number of protrusions in each group is at least two, and each group of protrusions is spirally arranged. An outer surface of each protrusion in contact with the corresponding filter plate is a smooth slope surface, and in the rotation direction of the vibration shaft, a height of the smooth slope surface gradually increases.

The contacting outer surface of the protrusion being the smooth slope surface is beneficial to a smooth contact between the protrusion and a bottom plane of the handle of the filter plate, avoiding the occurrence of the locking phenomenon of rotation of the vibration shaft, and improving the removal efficiency of the filter cake.

The contacting outer surface of the protrusion can be a helical shape.

In order to prevent the filter plate from being damaged due to a too large pull-apart distance, a cake unloading spacing chain 7 can further be provided between adjacent filter plates to limit the maximum pull-apart distance between two adjacent filter plates; and the cake unloading spacing chain 7 can be provided between both the upper ends and the lower ends of adjacent filter plates.

In each of the above embodiments, the driving component can be a motor, which is defined as a vibration gear motor 9 in this application. The vibration gear motor 9 is connected to the vibration shaft through a coupling 10. Two ends of the vibration shaft can be rotatably fixed on the frame through the bearings, the bearing seat 11 and other components.

A specific embodiment is described hereinafter, all the filter plates in the filter press in the embodiment are fully pulled apart to unloaded material through two times of operations, the details are as follows:

Referring again to FIGS. 1, 2, 3, 4 and 5, a filter press of spiral vibration cake unloading by pulling apart filter plates twice is provided in the present application. The oil cylinder is arranged as a lengthened type. The lengthened oil cylinder is that the length of the piston rod can allow 50% of the filter plates to be pulled apart for the first time to reach the distance of cake unloading. The piston rod is returned to its original position after the filtration is completed, and the piston rod drives the filter plate to be pulled apart to unload the filter cake for the first time, to reduce the working time and procedure of pulling apart the filter plate 5, thus multiple filter plates 5 can be pulled apart to unload the cake at the same time. A cake unloading spacing chain 7 is provided on both sides of the filter plate 5 to control the distance, and two spacing chains 7 are respectively provided on the upper and lower ends of the filter plate 5 to control the upper and lower space to drive a balance operation, thus keeping the space of the filter plates 5 to achieve a vertical cake unloading. One end of the oil cylinder bracket 8 is connected to a main beam, and the other end of the oil cylinder bracket 8 is installed to a lower end of the oil cylinder, which can make the oil cylinder to be installed stably and under a balanced stress. The piston rod connecting with the compression plate drives the filter plate 5 to realize the cake unloading through pulling apart the filter plate for the first time.

Figure 1:
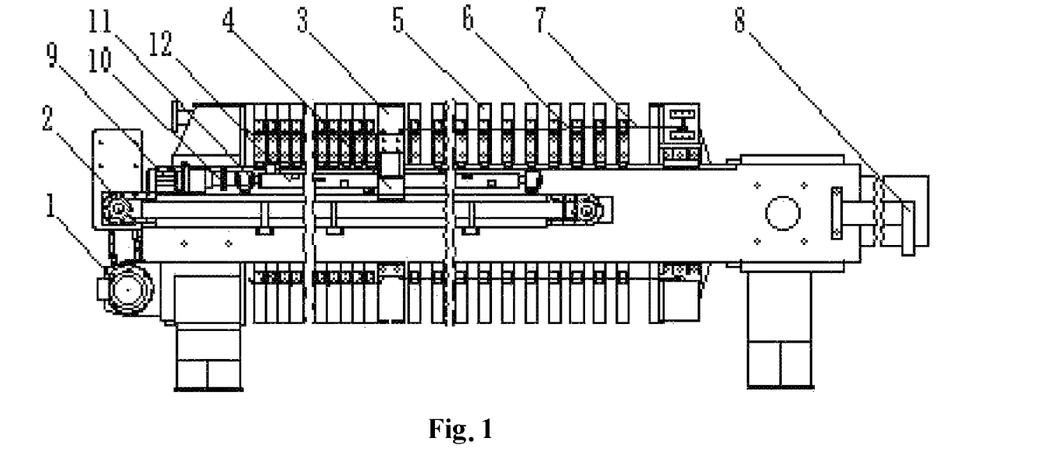
FIG. 1 is a schematic structural view of a filter press of spiral vibration cake unloading by pulling apart the filter plate twice.
Figure 2:
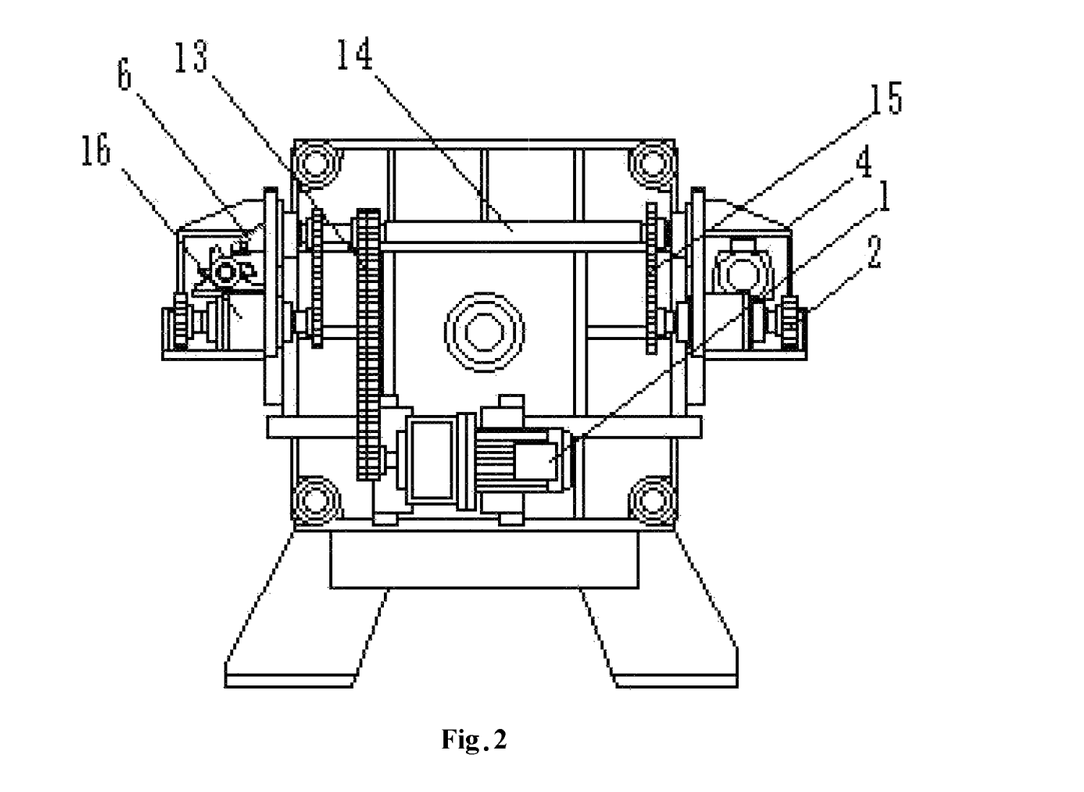
FIG. 2 is a schematic side view of the structure of FIG. 1.
Figure 3:
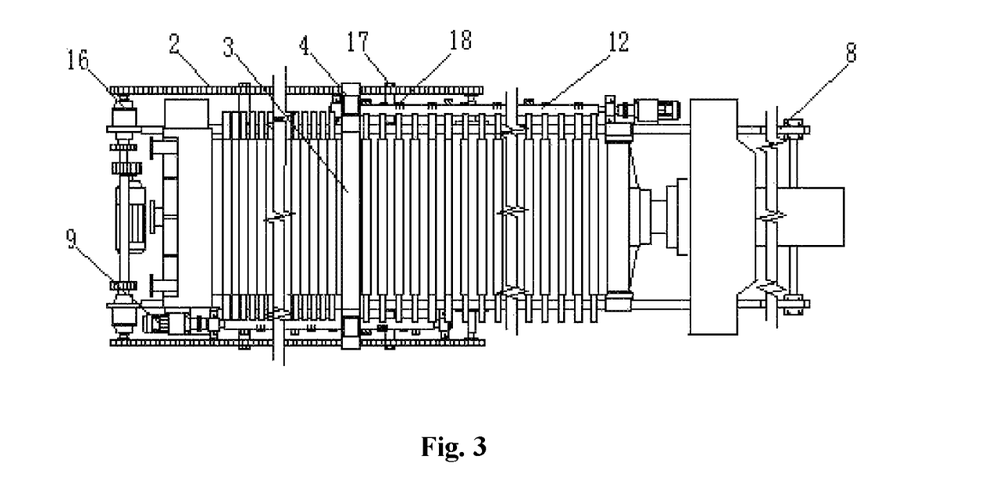
FIG. 3 is atop view of FIG. 1.
Figure 4:
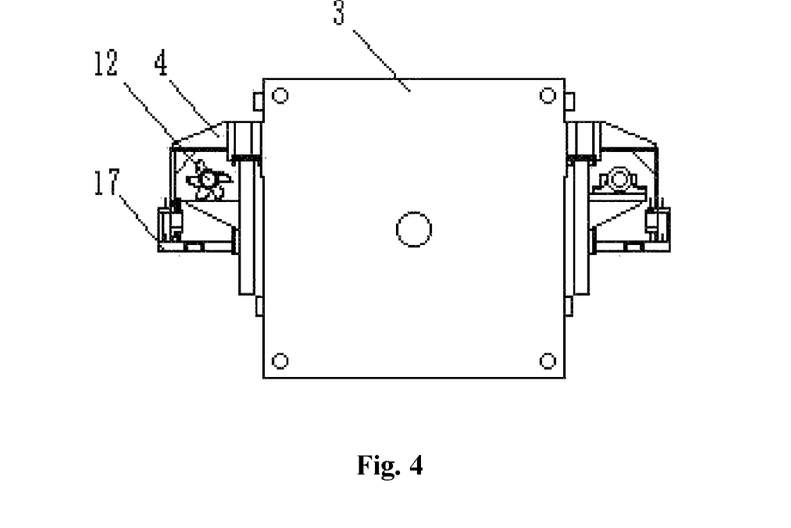
FIG. 4 is a schematic structural view of a middle partition board in FIG. 1.

The plate-pulling gear motor 1 is installed on a thrust plate of the filter press, and the plate-pulling gear motor 1 is provided with a driving sprocket wheel. The driving sprocket wheel is connected with a driving chain 13, a driven sprocket wheel is installed on a driving shaft 14, and the driven sprocket wheel is connected with the driving chain 13. A bearing seat installed at the upper end of the main beam is provided at both ends of the driving shaft 14, and the driving sprocket wheel is provided at both ends of the driving shaft 14. The driving sprocket wheel is connected with the driven chain 15, and a driven shaft 16 is provided. A bearing seat installed at the lower end of the main beam is provided on the driven shaft 16, and a driven sprocket wheel is provided at the two ends of the driven shaft 16. The driven sprocket wheel is connected with the driven chain 15 at one end of the driven shaft 16, and the driven sprocket wheel is connected with the plate-pulling chain 2 at the other end of the driven shaft 16. The plate-pulling chain is installed in a chain box at a side of the main beam, a support frame 17 is installed on the side of the main beam, and the chain box is installed on the support frame 17. The material for making the support frame 17 is a profiled channel steel, and the middle partition board 3 is provided, which is installed at a front end of a head plate of the filter plates 5 which are pulled apart at the second time. The material for making the middle partition board 3 is a steel medium plate, which is made of carbon structural steel. Two spacing chains T are provided at two sides of the filter plate 5 to control the distance, which keeps the distance of the filter plates to allow the unloaded cake fall vertically. A holder 4 is installed on both sides of the middle partition board 3, and a locking groove connected to a lug boss of the main beam is provided at an upper end of the holder 4 to achieve positioning, which can ensure a smooth operation of the middle partition board 3. A lower end of the holder 4 is connected to the plate-pulling chain 2, and the lower end of the holder 4 is connected to the plate-pulling chain 2 to be driven to operate. The middle partition board 3 is driven by the plate-pulling chain 2 to realize cake unloading through pulling apart the filter plates for the second time.

Figure 5:
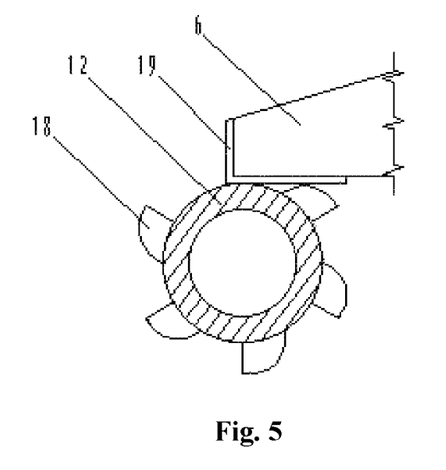
FIG. 5 is a schematic structural view of the spiral vibration cake unloading in FIG. 1.

A mechanical spiral vibration cake unloading device is provided. The cake unloading device includes a vibration gear motor 9. The vibration gear motor 9 is installed on the side of the main beam. A coupling 10 is installed on the vibration gear motor 9. And a vibration shaft 12 is provided, bearing seats 11 are provided at two ends of the vibration shaft 12, and the bearing seat 11 is installed on the side of the main beam, one end of the vibration shaft 12 is connected with a coupling 10 through bearing seats 11. The material used for making the vibration shaft is a seamless steel tube, spirally arranged and welded vibration blocks 18 (vibrant blocks are namely the protrusions described hereinabove) are provided on the vibration shaft 12. Each vibration block 18 corresponds to one handle 6 installed on the filter plate 5, and the handle 6 is installed on the filter plate 5, a wear-resisting block 19 connected with the vibration block 18 is provided on the bottom of the handle 6 to achieve cake unloading by vibration. The material used for making the wear-resisting block 19 is a stainless steel plate, an external shape of the vibration block 18 is arc-shape and the vibration block 18 is welded on the vibration shaft 12, and the vibration shaft 12 rotates to make the welded vibration block 18 impact the handle 6 to vibrate the filter plate, so that the adhered filter cake falls down. The above components are assembled to constitute the mechanical spiral vibration cake unloading device. Two sets of the mechanical spiral vibration cake unloading devices are provided and installed on the main beams, and the two sets of the mechanical spiral vibration cake unloading device are installed on the main beam on the left and the main beam on the right, respectively.

Working Process

All of the components are operated automatically by PLC programmable controller program as follows.

Filtration of the filter press is completed and cake unloading begins—return a piston rod of the lengthened oil cylinder block—the piston rod drives 50% of the filter plates to be pulled apart for cake unloading for the first time—the spiral vibration cake unloading device on the main beam on the right rotates—set timekeeping of the rotation time to stop—the plate-pulling gear motor 1 starts working—the plate-pulling chain 2 drives the middle partition plate 3 to pull apart 50% of the filter plates for cake unloading for the second time—the spiral vibration cake unloading device on the main beam on the left rotates—set the timekeeping of the rotation time to stop—a cycle of cake unloading of the filter press is completed.

It should be noted that the above embodiments are used only to illustrate the corresponding technical solution, not to restrict the technical solution described by the present application. Although the present specification is described in detail with reference to the above embodiments, it should be understood by those skilled in the art that the above embodiments can still be modified or replaced by those skilled in the art. All technical solutions and improvements without departing from the spirit and scope of the present application should fall within the scope of protection of the present application.

The invention claimed is:

1. A filter press, comprising a frame, and a power component, a plurality of filter plates and a vibration cake unloading device arranged on the frame, wherein:
   the filter plates are driven by the power component to move to and fro along the frame to be at a pressure filtration position and an unloading position; and the vibration cake unloading device comprises a driving component and a vibration shaft arranged longitudinally, protrusions are provided on an outer circumferential wall of the vibration shaft, when the filter plates are located at the unloading position, in a process that the driving component drives the vibration shaft to rotate around its own axis, the protrusions on the vibration shaft collide with the filter plates to assist in unloading, wherein the power component comprises an oil cylinder and an auxiliary power component;

in a longitudinal direction, all the filter plates are divided into a first part of filter plates and a second part of filter plates, and the oil cylinder drives all the filter plates to be at the pressure filtration position;

when the oil cylinder retracts to a fully retracted state, the filter plates in the first part of the filter plates are pulled apart by a predetermined distance to form an unloading space; and the auxiliary power component drives adjacent filter plates in the second part of filter plates to be pulled apart by a predetermined distance to form an unloading space, and meanwhile a distance between the filter plates in the first part of the filter plates decreases.

2. The filter press according to claim 1, wherein within a predetermined range in a vertical direction, the filter plates are movable up and down relative to the frame; when the filter plates are located at the unloading position, a handle of each of the filter plates is located above the vibration shaft, and during rotation of the vibration shaft, the handles of the filter plates intermittently contact with the protrusions to repeatedly vibrate upward and downward.

3. The filter press according to claim 1, wherein the number of filter plates in the first part of filter plates is the same as the number of filter plates in the second part of filter plates.

4. The filter press according to claim 1, wherein the auxiliary power component is a motor-sprocket wheel-chain structure, which comprises a motor and two plate-pulling chains driven by the motor, the two plate-pulling chains are respectively located on two sides of filter plates;

the filter press further comprises a middle partition board, which is fixedly connected with an outermost filter plate in the second part of filter plates and is close to an end of the first part of filter plates, and two sides of the middle partition board are respectively fixed to the plate-pulling chains on the two sides.

5. The filter press according to claim 4, wherein the motor is installed at a bottom of the frame, and the filter press further comprises a driving shaft which is transversely rotatably supported on the frame, the position of the driving shaft is higher than the position of the motor, an output shaft of the motor transmits power to the driving shaft through the motor-sprocket wheel-chain structure, and sprocket wheels meshing with the two plate-pulling chains are provided at two ends of the driving shaft, respectively.

6. The filter press according to claim 5, further comprising two sets of driven chains and driven shafts, wherein the sprocket wheels meshing with the plate-pulling chains are provided on the driven shafts, and the power of the driving shaft is transmitted to the driven shafts through the driven chains.

7. The filter press according to claim 1, wherein there are two vibration cake unloading devices, and the two vibration cake unloading devices are respectively used for vibrating the first part of filter plates and the second part of filter plates to unload cakes.

8. The filter press according to claim 1, wherein at least two groups of the protrusions are arranged along the longitudinal vibration shaft, the number of the protrusions in each group is at least two, and each group of protrusions is spirally arranged, an outer surface of each protrusion in contact with the corresponding filter plate is a smooth slope surface, and the smooth slope surface gradually increases in a rotation direction of the vibration shaft.

9. The filter press according to claim 1, wherein a cake unloading spacing chain is further provided between adjacent filter plates and is configured to limit a maximum distance between two adjacent filter plates being pulled apart; the cake unloading spacing chain is respectively provided between upper ends of adjacent filter plates and provided between lower ends of adjacent filter plates.

10. The filter press according to claim 1, wherein, the technical solution is:

the oil cylinder is provided with an oil cylinder bracket, the oil cylinder is a lengthened type, which has a length allowing the first part of filter plates to be pulled apart to reach a cake unloading distance, a cake unloading spacing chain is respectively provided on both sides of each of the first part of filter plates to control a distance;

the oil cylinder bracket has one end connected with a main beam and another end installed at a lower end of the oil cylinder, a piston rod of the oil cylinder is returned to an original position after filtration is completed, and the piston rod is connected with a compression plate to drive the first part of filter plates to be pulled apart to unload the cakes;

the auxiliary power component is provided with a plate-pulling gear motor, a driving shaft, and a driven shaft, the plate-pulling gear motor is installed on a thrust plate of the filter press, the plate-pulling gear motor is provided with a driving sprocket wheel, and the driving sprocket wheel is connected with a driving chain;

the driving shaft is provided with a driven sprocket wheel, the driven sprocket wheel is connected with the driving chain, the driving sprocket wheel is provided at both ends of the driving shaft, and the driving sprocket wheel is connected with a driven chain;

a driven sprocket wheel is provided on two ends of the driven shaft, one end of the driven sprocket wheel is connected with the driven chain, another end of the driven shaft is connected with a plate-pulling chain, the plate-pulling chain is installed in a chain box, and the chain box is installed on a side of the main beam;

the filter press is further provided with a middle partition board, which is installed at a front end of the second part of the filter plates, the spacing chains are installed on both sides of each of the second part of the filter plates;

a holder is provided, which is installed on both sides of the middle partition board, an upper end of the holder is provided with a locking groove to connect the main beam and a lower end of the holder is connected with the plate-pulling chain, the second part of the filter plates are pulled apart to unload the cake by the middle partition board driven by the plate-pulling chain;

the vibration cake unloading device is configured as a spiral vibration cake unloading device, which comprises a vibration gear motor, the vibration gear motor is provided with a coupling, a bearing seat is provided on both ends of the vibration shaft, one end of the vibration shaft is connected with the coupling through the bearing seat, spirally arranged vibration blocks are provided on the vibration shaft, and each vibration block corresponds to a handle installed on the filter plate, and a wear-resisting block is provided at a bottom of the handle, the above components are installed to form the spiral vibration cake unloading device;

two sets of the spiral vibration cake unloading devices are provided and are installed on the main beams, the two sets of the spiral vibration cake unloading devices are installed at a tail end of the main beam on the left and a head end of the main beam on the right, respectively.

11. The filter press according to claim 10, wherein a cake unloading spacing chain is provided on both sides of the filter plate to control a distance, and two cake unloading spacing chains are provided on upper and lower ends of two sides of the filter plate respectively to control the distance.

12. The filter press according to claim 10, wherein the chain box is installed on a side of the main beam, and a support frame is installed under the chain box, and the chain box is connected with the support frame and is installed on the side of the main beam.

13. The filter press according to claim 10, wherein a wear-resisting block is installed at a bottom of the handle, and material used for making the wear-resisting block is a stainless steel plate.

* * * * *